UNITED STATES PATENT OFFICE.

ALBRECHT SCHMIDT AND KARL THIESS, OF HÖCHST-ON-THE-MAIN, GERMANY, ASSIGNORS TO FARBWERKE VORM. MEISTER, LUCIUS & BRÜNING, OF HÖCHST-ON-THE-MAIN, GERMANY, A CORPORATION OF GERMANY.

GREENISH-BLUE HEXABROMINDIGO.

1,061,781.  Specification of Letters Patent.  Patented May 13, 1913.

No Drawing.  Application filed February 17, 1909.  Serial No. 478,433.

*To all whom it may concern:*

Be it known that we, ALBRECHT SCHMIDT, Ph. D., and KARL THIESS, Ph. D., citizens of the Empire of Germany, residing at Höchst-on-the Main, Germany, have invented certain new and useful Improvements in Greenish-Blue Hexabromindigo, of which the following is a specification.

In the literature it is stated that by bromination of indigo or of dibromindigo no higher brominated indigo can be obtained than the tetrabromindigo (see German Patent 195291). It is further stated that a hexahalogenindigo dyeing reddish-blue tints can only be obtained by treating with bromin and nitrobenzene the p-halogen derivatives of indigo which are only obtainable by synthesis and not by halogenation of indigo. We have now found that not only is pentahalogenindigo obtainable from indigo, (as claimed in U. S. patent application, Ser. No. 442,625, of July 8, 1908), but that even hexahalogenindigoes can be produced, if the process of bromination hereafter specified is employed, involving the use of a larger quantity of bromin than that employed for the manufacture of pentabromindigo, and preferably the use of an elevated temperature, heat applied for a longer period, and a more highly concentrated sulfuric acid; in the place of the indigo also the brominated indigoes, such as mono-, di-, tri- and tetra-bromindigo may be used, all of which, including indigo itself, may be comprised under the term "indigo substances unsubstituted in para position to the CO group." This new hexabrominated indigo dyes in the vat very clear greenish-blue tints. Therefore this dyestuff is entirely different, in regard to its composition, constitution and properties, from the hexahalogenindigo (p-p-dichlortetrabromindigo) described in German Patent No. 195291 and which is obtained from the synthetically produced p-p-dichlorindigo by bromination in nitrobenzene.

The process of making hexabrominated indigo may be carried out in the following manner: Indigo or brominated indigo produced by bromination is heated with an excess of bromin for some time to about 100–120° C. under pressure, or brominated indigo obtained by bromination is treated with the quantity of bromin calculated for hexabromindigo, or preferably with an excess of bromin, in a sulfur acid, which term implies highly-concentrated sulfuric acid of for instance 98% strength or monohydrate, or chlorosulfonic acid, or slightly fuming sulfuric acid of for instance 98% strength, or in monohydrate, or in chlorosulfonic acid or in slightly fuming sulfuric acid, during which operations the temperatures employed may be the lower the more highly concentrated the sulfuric acid is, as will be seen by the following examples:

Example I: 26 parts by weight of indigo are slowly poured into 260 parts of well cooled bromin. The mass is then stirred for some time without cooling and is finally heated for several hours to about 120° C. under pressure. The excess of bromin may be removed by distilling it off or by means of a current of air or by washing with carbon tetrachlorid. The greenish-black mass substantially consists of a perbromid of a hexabrominated indigo. For producing from it the hexabromindigo, the mass is poured into a bisulfite solution and ice, filtered off and washed with water. The hexabrominated indigo is thus obtained as a blue to greenish-blue powder of the constitution $C_{16}H_4O_2N_2Br_6$, which is insoluble in water, soluble in concentrated sulfuric acid with a blue color, and soluble in cold anilin with a greenish-blue to dark-blue color. Its capability of dissolving in organic solvents, such for instance as anilin, nitrobenzene, etc., is much greater than that of the tetrabromindigo. This hexabromindigo is also soluble in alkaline hydrosulfite solutions, thereby producing a vat which dyes cotton pure greenish-blue tints of remarkable brightness, as distinguished from the hexabromindigo described in German Patent No. 195,291 which dyes bright reddish-blue tints; in artificial light the dyeings obtainable by the herein-described hexabromindigo have even a much greener aspect.

Example II: 58 parts by weight of tetrabromindigo are gradually introduced into a cooled solution of 32–35 parts or less of bromin in about 300–350 parts of chlorosulfonic acid; the mixture is stirred for a short time while further cooling and then for several hours at 15–20° C. The operation is finished by pouring the mass into a bisulfite solution and ice, filtering and drying it. The dyestuff shows similar properties to that obtained according to Example I.

Example III: 42 parts by weight of dibromindigo are gradually introduced into a well cooled mixture of 65-75 parts of bromin and 420 parts of fuming sulfuric acid containing about 2-5% of anhydrid; the mass is stirred for a short time while further cooling and afterward without cooling and heated during several hours to 45-52° C. The working up is conducted in the same manner as stated in Example II. The dyestuff shows similar properties to that obtained according to Example I.

In general, it is sufficient and necessary that indigo, or its brom-substitution products obtained by brominating indigo, be treated, preferably while heating, with an excess of bromin of at least one atom of bromin above that quantity of bromin which is theoretically required for the hexahalogenation.

Having now described our invention what we claim is:

As a new product, the hexabromindigo of the constitution $C_{16}H_4O_2N_2Br_6$, being insoluble in water, soluble in concentrated sulfuric acid with a blue color and in cold anilin with a greenish-blue to dark-blue color, yielding by oxidation with nitric acid in presence of glacial acetic acid a 4.5.7-tribromisatin, melting at 257° C., also soluble in alkaline hydrosulfite solution forming then a vat which dyes cotton pure greenish-blue tints.

In testimony whereof, we affix our signatures in presence of two witnesses.

ALBRECHT SCHMIDT.
KARL THIESS.

Witnesses:
CARL GRUND,
JEAN GRUND.

Copies of this patent may be obtained for five cents each, by addressing the "Commissioner of Patents Washington, D. C."

---

It is hereby certified that in Letters Patent No. 1,061,781, granted May 13, 1913, upon the application of Albrecht Schmidt and Karl Thiess, of Höchst-on-the-Main, Germany, for an improvement in "Greenish-Blue Hexabromindigo," an error appears in the printed specification requiring correction as follows: Page 1, lines 60-63, strike out the words "of for instance 98% strength, or in monohydrate, or in chlorosulfonic acid or in slightly fuming sulfuric acid"; and that the said Letters Patent should be read with this correction therein that the same may conform to the record of the case in the Patent Office.

Signed and sealed this 4th day of August, A. D., 1914.

[SEAL.]

J. T. NEWTON,
*Acting Commissioner of Patents.* tion is finished by pouring the mass into a bisulfite solution and ice, filtering and drying it. The dyestuff shows similar properties to that obtained according to Example I.

Example III: 42 parts by weight of dibromindigo are gradually introduced into a well cooled mixture of 65–75 parts of bromin and 420 parts of fuming sulfuric acid containing about 2–5% of anhydrid; the mass is stirred for a short time while further cooling and afterward without cooling and heated during several hours to 45–52° C. The working up is conducted in the same manner as stated in Example II. The dyestuff shows similar properties to that obtained according to Example I.

In general, it is sufficient and necessary that indigo, or its brom-substitution products obtained by brominating indigo, be treated, preferably while heating, with an excess of bromin of at least one atom of bromin above that quantity of bromin which is theoretically required for the hexahalogenation.

Having now described our invention what we claim is:

As a new product, the hexabromindigo of the constitution $C_{16}H_4O_2N_2Br_6$, being insoluble in water, soluble in concentrated sulfuric acid with a blue color and in cold anilin with a greenish-blue to dark-blue color, yielding by oxidation with nitric acid in presence of glacial acetic acid a 4.5.7-tribromisatin, melting at 257° C., also soluble in alkaline hydrosulfite solution forming then a vat which dyes cotton pure greenish-blue tints.

In testimony whereof, we affix our signatures in presence of two witnesses.

ALBRECHT SCHMIDT.
KARL THIESS.

Witnesses:
CARL GRUND,
JEAN GRUND.

Copies of this patent may be obtained for five cents each, by addressing the "Commissioner of Patents Washington, D. C."

---

Correction in Letters Patent No. 1,061,781.

It is hereby certified that in Letters Patent No. 1,061,781, granted May 13, 1913, upon the application of Albrecht Schmidt and Karl Thiess, of Höchst-on-the-Main, Germany, for an improvement in "Greenish-Blue Hexabromindigo," an error appears in the printed specification requiring correction as follows: Page 1, lines 60–63, strike out the words "of for instance 98% strength, or in monohydrate, or in chlorosulfonic acid or in slightly fuming sulfuric acid"; and that the said Letters Patent should be read with this correction therein that the same may conform to the record of the case in the Patent Office.

Signed and sealed this 4th day of August, A. D., 1914.

[SEAL.]

J. T. NEWTON,
*Acting Commissioner of Patents.*

Correction in Letters Patent No. 1,061,781.

It is hereby certified that in Letters Patent No. 1,061,781, granted May 13, 1913, upon the application of Albrecht Schmidt and Karl Thiess, of Höchst-on-the-Main, Germany, for an improvement in "Greenish-Blue Hexabromindigo," an error appears in the printed specification requiring correction as follows: Page 1, lines 60–63, strike out the words "of for instance 98% strength, or in monohydrate, or in chlorosulfonic acid or in slightly fuming sulfuric acid"; and that the said Letters Patent should be read with this correction therein that the same may conform to the record of the case in the Patent Office.

Signed and sealed this 4th day of August, A. D., 1914.

[SEAL.]

J. T. NEWTON,
*Acting Commissioner of Patents.*